United States Patent [19]

Schneider et al.

[11] Patent Number: 4,834,590
[45] Date of Patent: May 30, 1989

[54] APPARATUS AND PROCESS FOR PNEUMATICALLY CONVEYING MATERIAL IN DUST OR FINELY PARTICULATE FORM

[75] Inventors: Klaus Schneider, Wilnsdorf; Klaus-Dieter Osenberg, Neunkirchen; Klaus-Juergen Heinrich, Siegen, all of Fed. Rep. of Germany

[73] Assignee: Freier Gunder Eisen- und Metallwerke GmbH, Neunkirchen, Fed. Rep. of Germany

[21] Appl. No.: 5,362

[22] Filed: Jan. 13, 1987

Related U.S. Application Data

[63] Continuation of Ser. No. 476,280, Mar. 17, 1983, abandoned.

[30] Foreign Application Priority Data

Mar. 18, 1982 [EP] European Pat. Off. ............ 82102192

[51] Int. Cl.[4] ............................................ B65G 53/10
[52] U.S. Cl. ..................................... 406/142; 406/136
[58] Field of Search ............................... 406/136–138, 406/141–143, 124–126, 133; 222/195, 630, 637; 366/101, 107

[56] References Cited

U.S. PATENT DOCUMENTS

| 1,339,977 | 5/1920 | Pruden ........................... 406/143 X |
| 3,179,378 | 4/1965 | Zenz et al. ..................... 406/142 X |
| 3,929,261 | 12/1975 | Soliman ......................... 406/137 X |
| 4,067,623 | 1/1978 | Klein et al. ........................ 406/124 |
| 4,153,304 | 5/1979 | Haskins ........................... 406/133 X |

FOREIGN PATENT DOCUMENTS

| 89380 | 9/1983 | European Pat. Off. ............ 406/142 |
| 714298 | 11/1941 | Fed. Rep. of Germany ...... 406/136 |
| 1030257 | 5/1958 | Fed. Rep. of Germany ...... 406/142 |
| 51251 | 10/1966 | Fed. Rep. of Germany . |
| 1281931 | 10/1968 | Fed. Rep. of Germany . |
| 2703736 | 8/1978 | Fed. Rep. of Germany . |
| 624851 | 9/1961 | Italy ................................... 406/137 |
| 1335523 | 10/1973 | United Kingdom . |
| 1458527 | 12/1976 | United Kingdom ................ 406/142 |

*Primary Examiner*—Sherman D. Basinger
*Assistant Examiner*—James M. Kannofsky
*Attorney, Agent, or Firm*—Barnes, Kisselle, Raisch, Choate, Whittemore & Hulbert

[57] ABSTRACT

A pneumatic conveying apparatus for conveying loose material comprises a device for feeding material to be conveyed, into a container, and a conveyor nozzle for producing a jet of pressure gas for entraining material into a conveyor conduit. An annular nozzle array or annular gap is provided around the conveyor nozzle, to produce a flat flow of gas, which is concentric to the jet of gas produced by the conveyor nozzle. The jet of gas and the flat flow combine in a gap between the conveyor nozzle and the adjacent mouth of the conveyor conduit, and pass into the conveyor conduit, with the material to be conveyed being controllably entrained thereby. The installation is controlled to operate in the range of maximum loading of material in the conveying gas flow.

9 Claims, 4 Drawing Sheets

APPARATUS AND PROCESS FOR PNEUMATICALLY CONVEYING MATERIAL IN DUST OR FINELY PARTICULATE FORM

This application is a continuation of application Ser. No. 476,280, filed Mar. 17, 1983, now abandoned.

BACKGROUND OF THE INVENTION

This invention relates generally to an apparatus and process for pneumatically conveying loose or bulk material in dust or fine-grain form.

One form of pneumatic conveyor apparatus comprises (see for example German Offenlegungsschrift No. 27 03 736) a container for containing the material to be conveyed, with a material feed means in the upper region, and a conveyor nozzle in the lower region. Disposed at a spacing from the conveyor nozzle is a conveyor conduit into which material is entrained from the container by a flow of gas under pressure from the nozzle. A discharge control line is also introduced laterally into the container to provide further control in the conveying action, with pressure gas being introduced through the control line and flowing through part of the loose or bulk material, to entrain some of the material when the gas then flows out through the conveyor conduit. However, when the pressure gas is introduced into and flows through the material in the container, that can also result in the material being compacted, particularly when the direction of flow is downwards, and such compacting will almost invariably have a detrimental effect on the uniformity and regularity of the conveying action.

SUMMARY OF THE INVENTION

An object of the present invention is therefore to improve a pneumatic conveyor apparatus and process, in regard to the uniformity of conveying action.

Another object of the present invention is to provide a pneumatic conveyor apparatus for conveying loose or bulk material in dust or fine-grain form, which is less susceptible to compacting of the material in the course of conveying thereof.

Still another object of the present invention is to provide a pneumatic conveying method in which the conveying action is optimised by a particular mode of feeding gas to entrain material to be conveyed.

A further object of the present invention is to provide a pneumatic conveying process wherein the proportion of solid matter in the conveying flow is so controlled as to ensure optimum conveying conditions.

Yet a further object of the present invention is a process for pneumatically conveying loose material by means of a main conveying gas flow and an auxiliary discharge control flow which are so matched to each other as to optimise the conveyor effect.

These and other objects are achieved in an apparatus for pneumatically conveying bulk or loose material in dust or finely particulate form, comprising a container for the material to be conveyed, which is provided in its upper region with a material feed means and in its lower region with at least one conveyor nozzle for supplying a jet of gas into the container. Disposed facing the at least one conveyor nozzle and separated therefrom by a gap is an upwardly extending conveyor pipe for receiving material entrained by the flow of gas from the conveyor nozzle. Associated with the or each conveyor nozzle is a further gas discharge means for supplying discharge control gas towards the gap, to control the mass flow of material into the conveyor pipe. The additional flow of discharge control gas is supplied concentrically around the conveyor nozzle by means of an annular gas discharge gap or an annular array of nozzles, thereby to produce a concentric flat flow of gas towards the gap between the conveyor nozzle and the conveyor pipe. The nozzles of the above-mentioned array are preferably disposed tangentially, ie, pointing to the conveyor nozzle, and the flat flow of gas from the nozzles or annular gap is preferably guided towards the conveyor nozzle along a guide surface provided at the bottom of the material container.

In a process for pneumatically conveying loose material by means of a conveyor apparatus comprising a container for the material, one or more conveyor nozzles for entraining material in the container into one or more associated conveyor conduits which are each separated from the respective conveyor nozzle by a feed gap, whereby the or each conveyor nozzle produces an upwardly directed jet of gas having an adjustable conveying gas volume flow, loose material is also introduced into the conveying gas volume flow from the side thereof by means of a flow of discharge control gas, the conveying gas flow and the discharge control gas then combining to form a total flow of conveying gas for entraining material through the conveyor conduit or conduits. The discharge control flow is in the form of a flat flow of gas concentrically around and towards the jet of gas issuing from the associated conveyor nozzle, and the total flow of gas entraining the material to be conveyed is varied in respect of the proportions of the discharge control flow and the conveying gas flow until the working point of maximum loading of the gas with material to be conveyed is established, with the control range in respect of the discharge control flow and the conveying gas flow being set at least substantially in the vicinity of the range of maximum material loading.

By virtue of the mouth or discharge opening of the discharge control line, by means of which it opens into the container, being in the form of an annular array of preferably tangential nozzles or the annular gap, the pressure gas supplied thereby flows into the feed gap between the or each conveyor nozzle and conveyor conduit, entraining material, but without compacting the material in the container. The flow of gas produced by the conveyor nozzle entrains the material and, by virtue of suitable selection in regard to the proportion of solid matter (mass flow of the material/mass flow of the pressure gas), ensures that the uniformity of the conveying action is maintained as far as the destination of the material.

Other objects, features and advantages of the process and apparatus in accordance with the principles of this invention will become apparent in the following description of an embodiment by way of example.

DESCRIPTION OF THE PREFERRED EMBODIMENT

Figure 1:
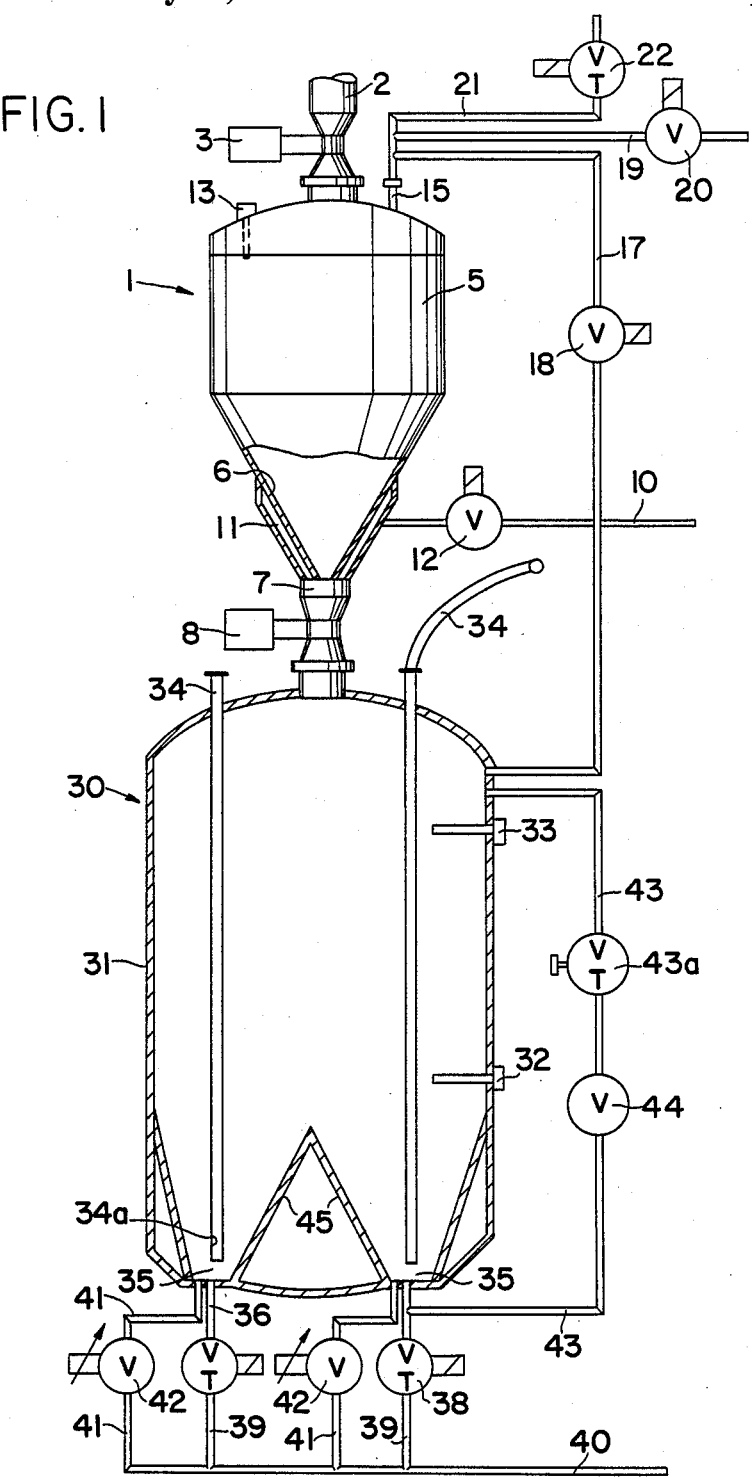
FIG. 1 shows a push-type feeder or conveyor installation.

Referring to FIG. 1, reference numeral 1 denotes a charging lock device for filling the conveyor installation with loose or bulk material in dust or finely particulate form. Connected to the device 1 is a material supply line 2 which can be shut off by means of a slide control member or valve 3. The device 1 comprises at least one charging lock container 5 having a conical bottom portion, as shown, which has flow feed or inlet regions comprising porous high-grade steel and which is therefore referred to as the flow feed bottom 6, for a feed of pressure gas into the container 5, as will be described below. The container 5 can be emptied into a container 31 by way of a material line or conduit 7 which can also be selectively closed off by way of a slide control member or valve 8. A gas feed line or conduit 10 leads into a chamber 11 which is in the configuration of the surface of a cone, being provided on the outside of the conical bottom portion of the container 5 and from which the flow feed bottom 6 is supplied with pressure gas which can thus flow throuh the bottom 6 into the container 5. The line 10 can be opened and closed by means of an electromagnetically operable gas control valve 12.

Disposed at the upper end of the container 5 are a probe or sensor 13 for detecting the level of filling of material in the container 5, and a gas discharge connection 15. Connected to the connection 15 are an overflow line 17 for overflow from the container 31, a vent line 19 and a throttle line 21 which can each be opened or closed by an electromagnetically operable overflow valve 18, a vent valve 20 and a throttle valve 22 respectively.

The device 1 represents a material feed device for feeding material into a conveyor installation referred to as a push-type feeder or conveyor 30 which comprises the pressure container 31 connected in its upper region to the charging lock device 1 by way of the material conduit 7 and the overflow line 17. The container 31 has two sensors or probes 32 and 33 for detecting the minimum filling level and the maximum filling level respectively. The arrangement has at least one and preferably a plurality of vertically extending conveyor lines or conduits 34 which are unflared and which extend downwardly into the interior of the container 31 as far as the lower portion thereof and which are each disposed with their mouth opening above and opposite an associated conveyor nozzle 36, being separated from the respective conveyor nozzle 36 by a respective feed gap 35. The width of the gap 35 is adjustable and may possibly be adjusted to different values, including a zero value (not shown).

Figure 2:
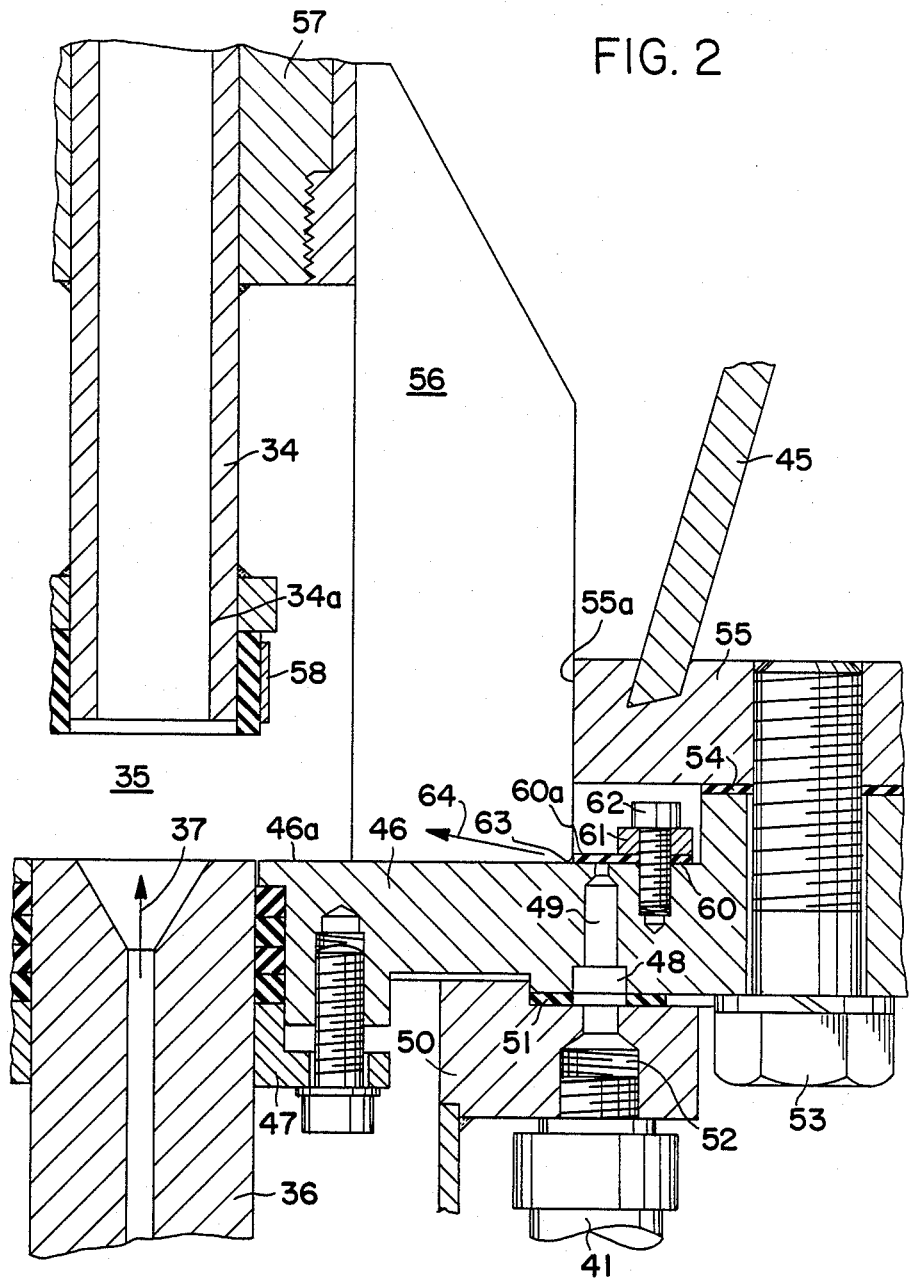
FIG. 2 shows a detail of the FIG. 1 construction on an enlarged scale.

Referring now also to FIG. 2, a flow of pressure gas 37 which passes vertically upwardly through and from each conveyor nozzle 36, in the form of a jet of gas, can be adjusted and controlled by means of respective throttle valves 38 incorporated in pressure gas distribution conduits 39. The conduits 39 are supplied with gas from a common supply conduit 40, from which discharge control conduits or lines 41 also branch off. A respective discharge control line 41 is associated with each gap 35, each control line 41 having a gas flow controller 42. A compensating or balancing conduit 43 which branches off one of the pressure gas supply conduits 39 communicates with the upper portion of the container 31, and has a shut-off valve 44 and an adjustable throttle means 43a.

As shown in FIG. 1, also provided in the lower region of the feeder 30 or container 31 and associated with each said nozzle 36 are installation means 45 which define respective funnel configurations around the associated gaps 35 and make the conveying action and conditions thereof virtually independent of the adjacent gap or gaps 35.

FIG. 2 shows a view in greater detail of the structure in the region of the gap 35. A bottom plate 46 has a stepped bore for mounting the respective conveyor nozzle 36 and a sealing arrangement 47 which is secured thereto by screw retaining means. The bottom plate 46 and the mouth of the nozzle 36 are flush with each other and thus form a guide surface indicated at 46a. In its underside, the plate 46 also has an annular passage 48 around the nozzle 36, from which passage there extends a ring or annular array of nozzles 49 which are thus disposed around the conveyor nozzle at at least substantially identical spacings therefrom. The annular passage 48 is covered over in a downward direction by a flange cover member 50 and is sealed relative to the exterior by flat sealing members 51. The cover member 50 has a screwthreaded bore 52 to which the discharge control line 41 is sealingly secured, for supplying the annular passage 48 with pressure gas. The plate 46 is secured to a bottom wall portion 55 of the container 31 by means of screws 53, with interposed flat sealing members 54; release of the screws 53 permits the plate 46 to be removed and replaced. The wall portion 55 has a bore 55a into which are fitted an array of guide plates or baffles 56 arranged in a star-like configuration. The plates 56 are held together by means of a ring 57 and generally resemble the stabilizing fins of a missle. The ring 57 also serves for fixing the plates 56 to the conveyor pipe 34, thereby to support upstream or bottom end 34a thereof. Sealing members as at 58 may be mounted at the end 34a of the conveyor pipe 34.

The array of nozzles 49 is covered by a resilient ring 60 which is secured to the plate 46 by a metal retaining ring 61 and screws 62. In the region of the nozzles 49, the ring 60 forms a lip 60a which, under the force of the pressure gas which is supplied by way of the discharge control line 41 and the passage 48, is deflected away from the plate 46 and thus opens an annular gap 63 which extends around the associated conveyor nozzle 36 and produces a flat flow 64 of gas directed concentrically towards the gap 35. The concentric flat flow 64 is guided by the guide surface 46a of the plate 46 and finally assumes the height of the gap 35.

Figure 5:
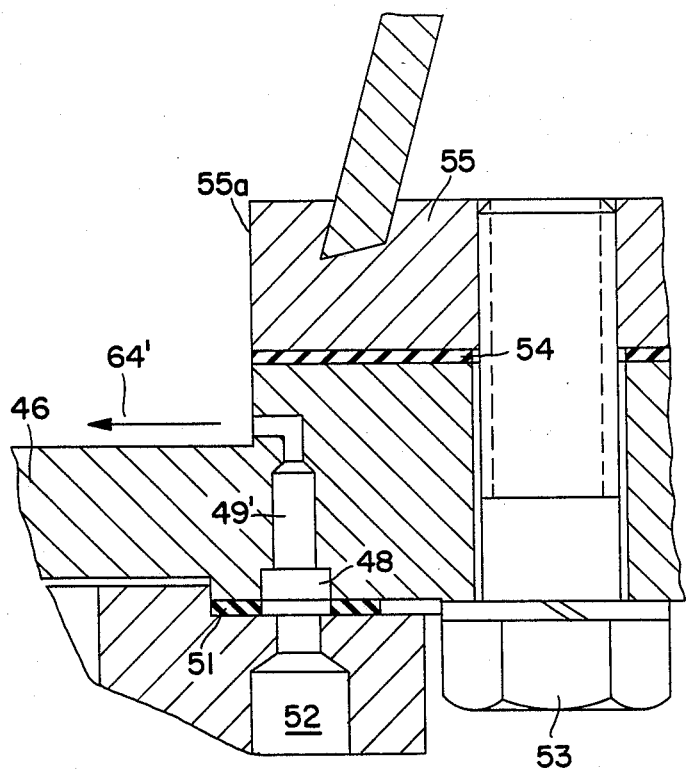
FIG. 5 is a fragmentary sectional view of a modified form of nozzle array.

Instead of the arrangement forming an annular gap as indicated at 63, it is also possible to provide an array of tangential nozzles, as shown in FIG. 5, that is to say, an annular array in which the individual nozzles 49 are each directed tangentially to the guide surface 46a, and thus point towards the conveyor nozzles.

Operation of the apparatus is as follows:

When the sensor or probe 32 for detecting the minimum level of filling of the device 30 is activated, the vent valve 20 and the feed gas valve 12 are opened so that gas flows into the container 5 through the bottom member 6. At the same time, the slide control member 3 is opened and thus the container 5 is filled with loose or bulk material. When the level detector 13 thereof detects that the material has reached the maximum set level of filling therein, the slide valve 3 is closed, the throttle valve 22 is opened and the vent valve 20 is closed. Gas continues to flow into the container 5 through the flow bottom 6 and a small amount of gas also flows away through the throttle valve 20 so that the material in the container 5 is maintained in a loosely filled condition. A gradual increase in pressure in the container 5 therefore does not result in the loose material settling and compacting down, which is a danger that arises if the container 5 is subjected to a feed gas pressure from above and the loose material concerned is a dust.

When the pressure in the container 5 reaches the pressure in the device 30, the throttle valve 22, the feed gas valve 12 and the overflow valve 18 are closed and the slide valve 8 is opened so that the material flows into the device 30. The overflow valve 18 and the slide valve 8 are then closed, so that the operation of charging the device 30 with material from the container 5 is concluded.

The gas supply conduit 40 supplies a total volume flow $\dot{V}$ which is divided up into individual volume flows $\dot{V}_f$ for the conveyor gas through nozzle 36 and $\dot{V}_a$ for the discharge gas (through nozzles 49). The total flow $\dot{V}$ then appears again in the conveyor conduit 34, that flow thus being charged with the loose or bulk material to be conveyed. The ratio of the mass flow $\dot{m}g$ of loose or bulk material to the mass flow $\dot{m}g$ of the conveyor gas is designated $\mu$. If the total flow $\dot{V}$ is below a given value, dependent on the installation, no loose or bulk material is conveyed. With an increasing total flow $\dot{V}$, the material loading $\mu$ in the conveying gas increases until a maximum loading condition $\mu_{max}$ is reached. When that is the case, the lowest level of specific energy consumption is attained. A further increase in the total flow $\dot{V}$ results in a drop in the material loading factor $\mu$, with a tendency of asymptotic approximation towards zero.

Figure 3:
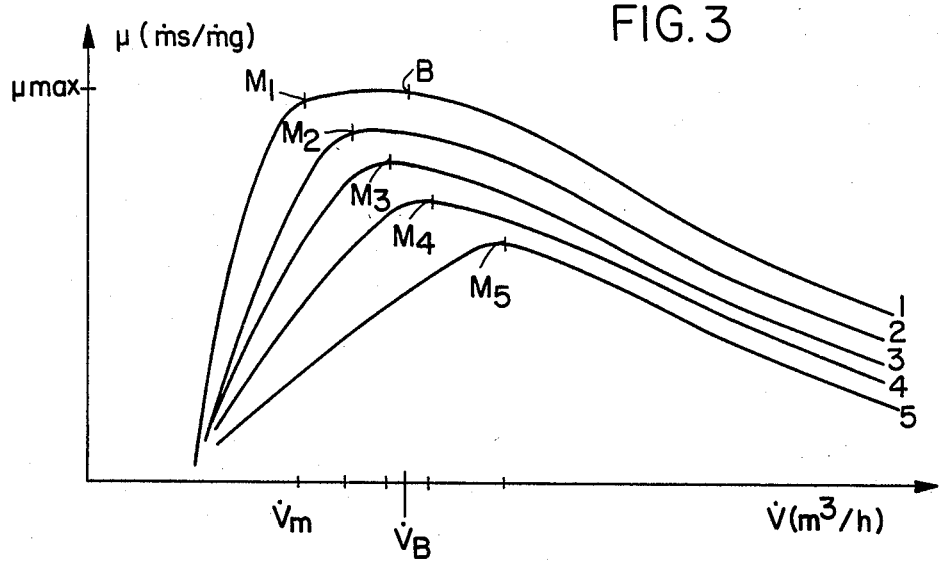
FIGS. 3 and 4 show families of characteristic curves in respect of the conveying procedure.

The family of curves indicated at 1 to 5 in FIG. 3 was obtained with varying ratios in respect of the conveyor gas flow $\dot{V}_f$ (through nozzle 36) relative to the discharge gas flow $\dot{V}_a$ (through gap 63). With the relative increase in the discharge gas total flow $\dot{V}_a$, the maximum loading $\mu_{max}$ generally increases.

Figure 4:
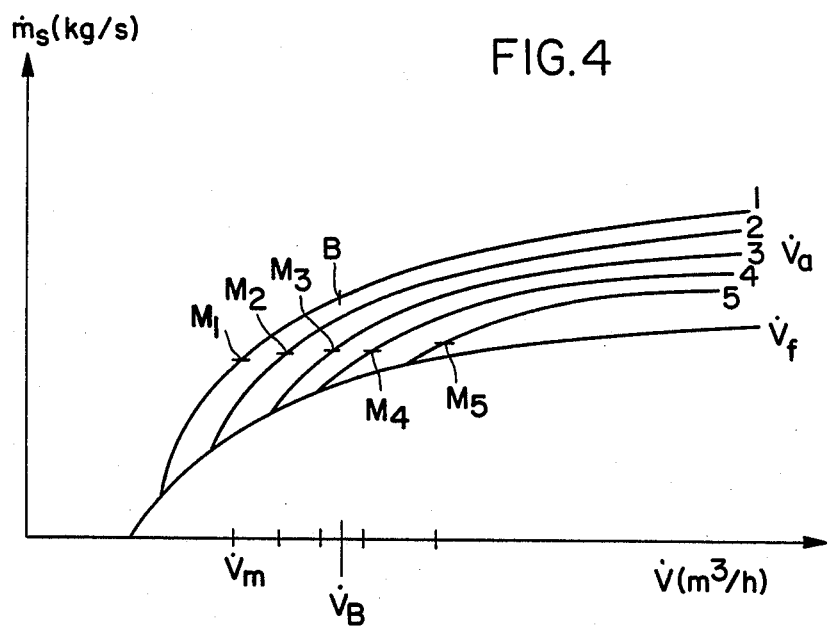

FIG. 4 shows the amount $\dot{m}_s$ (in kg/second) of loose or bulk material conveyed, in dependence on the total flow $\dot{V}$, wherein the curve $\dot{V}_f$ denotes conveying only with the gas supplied by way of the nozzles 36. Starting in each case from a fixed value in respect of the conveyor gas flow $\dot{V}_f$, curves 1, 2, 3, 4 and 5 in respect of the discharge gas flow $\dot{V}_a$ branch away, from which it will be seen that the discharge gas flow $\dot{V}_a$ makes a great contribution to increasing the material loading $\mu$, as long as operation is in the initial branch portion of the family of curves. M$_1$ to M$_5$ indicate the working points for maximum material loading. It is preferred for the installation to be controlled to operate in that region, the conveying action being more uniform to the right of the respective points M$_1$ to M$_5$ than to the left of those points. The situation illustrated assumes an operating or working point B which is 1.5 times the flow $\dot{V}_m$.

In general, a given through-put of loose or bulk material of for example 1 kg/second is required. In order to achieve such a through-put rate, the flow $\dot{V}_B$ can only be achieved with the additional use of discharge gas (through the gap 63), although it would also be possible to operate only with the conveyor gas, in which case operation would be very uneconomical. With regard to the quality of the control action, the following control ranges are preferred:

| | |
|---|---|
| $\dot{V}_f$ | = 0.3 to 0.8 $\dot{V}$, |
| $\dot{V}_a$ | = 0.3 to 0.8 $\dot{V}_m$ |
| $\dot{V}_f + \dot{V}_a$ | = 1.0 to 1.5 $\dot{V}_m$ |

The configuration of the curves in FIGS. 3 and 4 depends on the material to be conveyed and the respective geometrical conditions of the push-type feeder 30 and in particular the diameter of the conveyor conduit 34 which has a great influence on air speed. Therefore, it is necessary for the best control range in respect of the total flow $\dot{V}$ and the manner of distribution to form the flows $\dot{V}_f$ and $\dot{V}_a$ to be determined, for each pneumatic conveyor installation. Within those advantageous ranges, it is possible to achieve a very high degree of uniformity in the conveying action, that is to say, a given desired flow of material can be maintained, with accuracy, over prolonged periods of time. The pneumatic conveyor apparatus and process according to the invention are for that reason particularly suitable for metering operations.

Various other modifications and alterations may be made in the above-described process and apparatus, without thereby departing from the spirit and scope of the invention.

What it claimed is:

1. A pneumatic conveyor apparatus for conveying fine loose material comprises:
   a container having an upper portion, a bottom portion including a flat closed bottom plate;
   material feed means for feeding material to be conveyed into the upper portion of said container;
   at least one material conveyor nozzle in the bottom plate of the container operative to supply any upwardly directed jet of pressurized conveying gas;
   a conveyor conduit having upper and lower ends, the lower end thereof being unflared and disposed at a spacing with respect to said conveyor nozzle and being adapted to receive material entrained by said jet of pressurized conveying gas from said conveyor nozzle, thereby forming a push-type material conveyor means;
   and at least one discharge control conduit means operative to supply discharge control gas to said material conveyor means for controlling mass flow of the material to be conveyed into said conveyor conduit;
   said discharge control conduit means including a gas discharge orifice means disposed at least substantially concentrically around the associated respective conveyor nozzle to supply gas to the conveyor nozzle in the form of a concentric flat flow along the flat bottom plate of the container acting as a guiding surface for the material in a direction towards said spacing between the associated conveyor nozzle and said conveyor conduit.

2. Apparatus set forth in claim 1 wherein said gas discharge orifice means comprises an annular array of gas discharge nozzles extending toward said conveyor nozzle.

3. An apparatus as set forth in claim 1 wherein said gas discharge orifice means includes an annular gap through which said gas flows towards said associated conveyor nozzle.

4. Apparatus as set forth in claim 1 including means replaceably connecting said flat closed bottom plate to said bottom portion.

5. Apparatus as set forth in claim 1 wherein a member of funnel-like configuration is disposed around said one conveyor nozzle.

6. Apparatus as set forth in claim 1 wherein said material feed means for feeding material to said container comprises a charging lock operative as a charging lock means to feed a flow of charging gas and feeding material into said container.

7. A process for pneumatically conveying fine loose material by means of a push-type conveyor means comprising a container having a bottom, said process comprising positioning at least one conveyor nozzle through the bottom, positioning at least one conveyor conduit in association with said at least one conveyor nozzle and separated therefrom by a respective spacing, directing pressurized gas through said conveyor nozzle to produce an upwardly directed jet of pressurized gas with an adjustable conveyor gas volume flow, introducing material to be conveyed into said jet of gas from the side by means of a discharge gas volume flow, in the form of a concentric flat flow along the bottom of the container acting as a guiding surface for the material towards the jet of gas, such that the discharge gas volume flow and the conveyor gas flow are combined to produce a total volume gas flow in said conduit, varying the proportions of the discharge gas volume and the conveyor gas volume until the working point of maximum loading in the gas flow for a predetermined total gas flow is established and controlling the actual amount of material conveyed by varying the discharge gas flow and the conveyor gas flow while keeping the predetermined total gas flow.

8. The process set forth in claim 7 including maintaining the discharge gas flow at from 0.3 to 0.8 of the total volume gas flow and maintaining the predetermined total gas flow.

9. A process for pneumatically conveying fine loose material from a container having an upper portion and a bottom portion including a flat closed bottom plate which comprises feeding material to be conveyed into the upper portion of said container;

positioning at least one material conveyor nozzle in the bottom plate of the container operative to supply any upwardly directed jet of pressurized conveying gas;

positioning a conveyor conduit having upper and lower ends, the lower end thereof being unflared at a constant spacing with respect to said conveyor nozzle for receiving material entrained by said jet of pressurized conveying gas from said conveyor nozzle, thereby forming a push-type material conveyor means;

and supplying discharge control gas to said material for controlling mass flow of the material to be conveyed into said conveyor conduit;

directing gas to the conveyor nozzle in the form of a concentric flat flow along the flat bottom plate of the container acting as a guiding surface for the material in a direction towards the space between the associated conveyor nozzle and the conveyor conduit.

* * * * *